March 2, 1943.                O. L. DERRICK                 2,312,323
                    ROLLER DRIVE FOR KELLY JOINTS
                      Filed Jan. 30, 1940          3 Sheets-Sheet 2
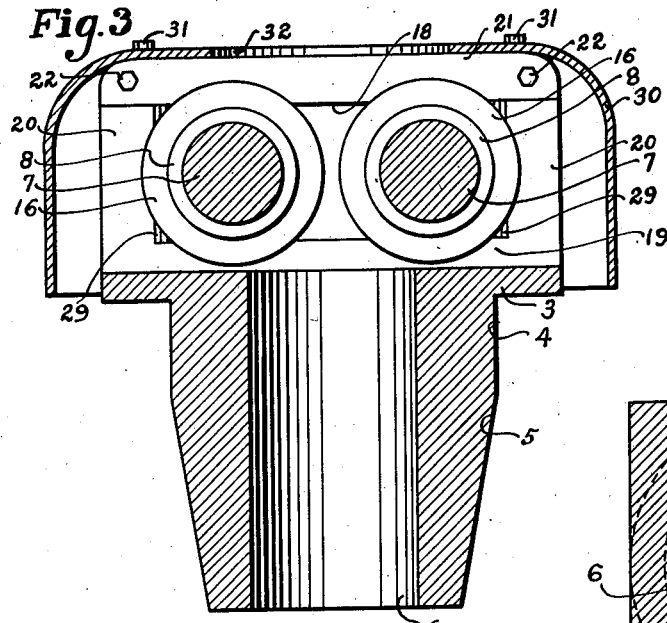
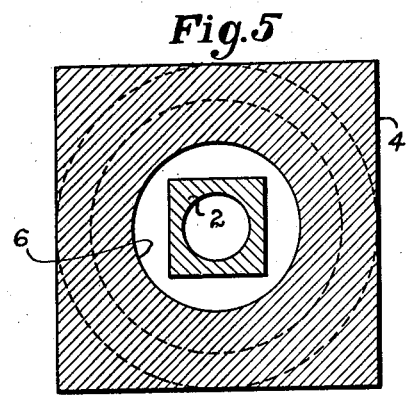
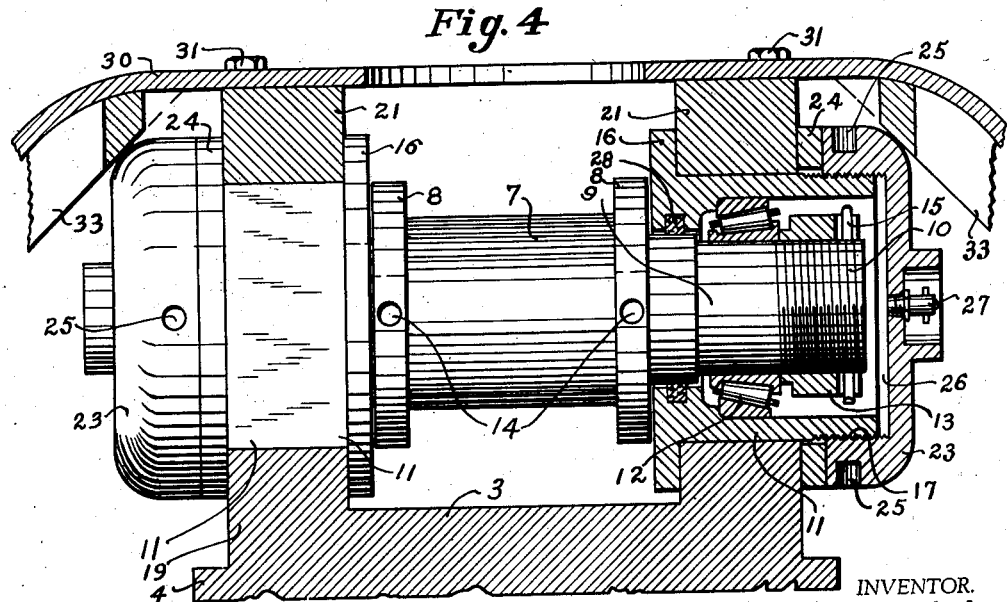
INVENTOR.
Oscar L. Derrick
BY
             his ATTORNEY.

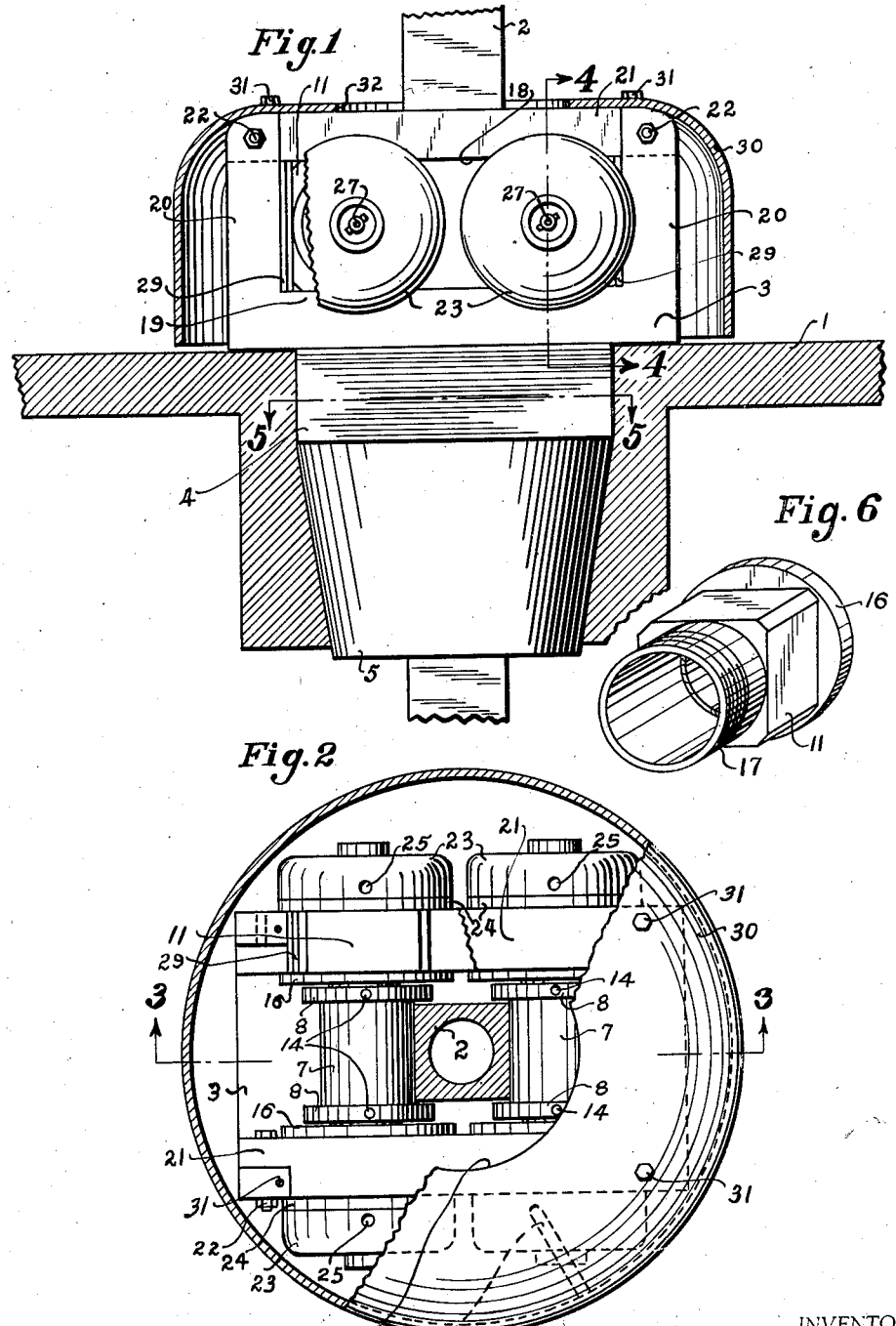

March 2, 1943.  O. L. DERRICK  2,312,323
ROLLER DRIVE FOR KELLY JOINTS
Filed Jan. 30, 1940  3 Sheets-Sheet 3

INVENTOR.
Oscar L. Derrick
BY
ATTORNEY.

Patented Mar. 2, 1943

2,312,323

UNITED STATES PATENT OFFICE 2,312,323

ROLLER DRIVE FOR KELLY JOINTS

Oscar L. Derrick, Wichita Falls, Tex., assignor of five-twelfths to D. Houston Bolin, and four-twelfths to Henry L. Rugely, both of Wichita Falls, Tex.

Application January 30, 1940, Serial No. 316,423

10 Claims. (Cl. 308—6)

This invention relates to an improvement in roller guide for Kelly joints of the character used in rotary tables of rotary drilling rigs.

In the rotary method of drilling, the drill stem or Kelly joint is rotated by a rotary table located at the derrick floor while permitting vertical movement of the drill stem or kelly therethrough to accomplish the drilling operation. A guide bushing is provided usually in the table to impart the turning movement to the drill stem or kelly while permitting of said vertical movement.

Heretofore, such bushings have been composed of metal bushings having an opening therein of a size and shape to receive the drill stem or kelly and permit of longitudinal movement thereof while it is being rotated. Due to the frictional contact of the Kelly joint with the inner walls of the opening, wear occurs repeatedly on the Kelly joint and bushing and frequent repairs and replacement are necessary. Some suggestions have been made for the use of guide rollers in the bushings but for the most part these have not been practical and have not been adopted for general use.

The object of this invention is to dispense with the usual guide bushing for the drill stem while providing for freedom of longitudinal movement of the drill stem relative to the rotary table during the imparting of a turning movement thereto, and without material wear between the drill stem and bushing. Provision is made to compensate for any wear that does occur by adjustment of the parts, but at the same time wear is reduced to a minimum, eliminating danger of breakage of parts and the hazard of operation usually incident to the use of rotary table drive bushings.

In this invention, opposing rollers are provided which are mounted for rolling contact with opposite sides of a drill stem, such as a polygonal kelly that is usually square or fluted in shape, and these rollers are mounted for adjustment toward and from the axis of the bushing, and for secure fastening in adjusted positions to take up for any wear that does occur in a simple and effective manner. This provides freedom for longitudinal movement of the drill stem relative to the rotary table while providing a driving relation therebetween, so as to rotate the drill stem by turning movement of the table.

A preferred embodiment of this invention, together with a modification thereof, are illustrated in the accompanying drawings, in which:

Fig. 1 is a side elevation of the rotary table drive bushing, with parts broken away and in section to show details of construction;

Fig. 2 is a top plan view thereof, with parts broken away and in section;

Fig. 3 is a vertical sectional view through the bushing on the line 3—3 of Fig. 2;

Fig. 4 is a cross sectional view therethrough on the line 4—4 of Fig. 1, with parts in elevation;

Fig. 5 is a horizontal sectional view on the line 5—5 of Fig. 1;

Fig. 6 is a detached perspective view of the bearing box removed from the roller assembly;

Figure 7:
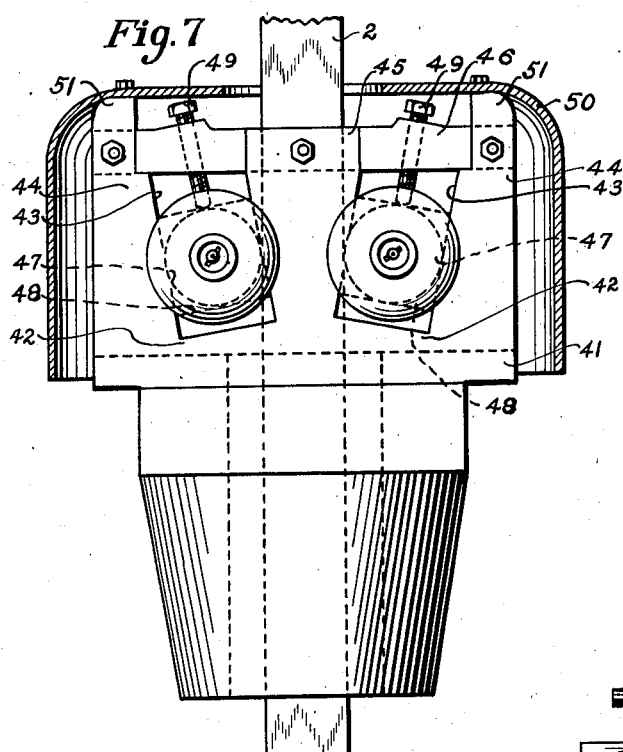
Fig. 7 is a side elevation, partly in section, showing a modified form of the invention.
Figure 9:
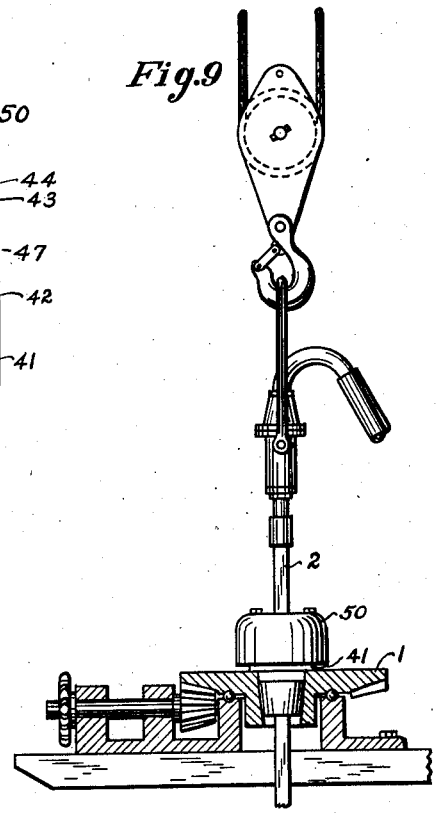
Fig. 9 is a side elevation, partly in section, of a kelly, support, and rotary table, showing the invention applied thereto.

This invention is designed for use in a rotary table of the character shown generally in Fig. 1 for connection therewith and to impart turning movement to a drill stem 2. This drill stem is shown in the form of a square or polygonal kelly frequently used with rotary drilling apparatus.

For the purpose of guiding the kelly or drill stem while imparting turning movement thereto, I have provided a guide bushing comprising a body portion designated generally by the numeral 3, and having a square base 4 with a depending conical portion 5. The base 4 and conical portion 5 are shaped and constructed to fit in seats correspondingly shaped and formed in the rotary table 1 to provide a tight fit of the bushing body 3 with said table. The bushing body 3 has a central opening 6 therethrough (Fig. 3) of sufficient size to permit freedom of movement of the drill stem 2 therethrough.

Disposed on opposite sides of the kelly 2 is a pair of rollers 7 guiding the kelly while imparting thereto the turning movement of the rotary table. The rollers 7 are mounted for turning movement about transverse axes and are preferably adjustable toward and from the axis of the rotary table and bushing body to insure a proper guiding action of the kelly.

Each of the rollers 7 is provided with guide flanges 8 spaced longitudinally from each other a distance sufficient to receive the kelly therebetween, as shown in Fig. 2, and the opposite ends of each roller form reduced bearing portions 9, each outer end of which is screw-threaded at 10. Each roller 7 is formed integral with the flanges 8 and reduced ends 9, by dressing down a single bar of steel, thereby materially reducing the danger of breakage due to the heavier construction and the reduction of wear substantially to the point of contact with the kelly.

Each opposite end of the roller 7 is journaled in a bearing box 11 in anti-friction bearings 12, which are shown as tapered roller bearings that are adapted to be held in place and adjusted by a nut 13 on the threaded portion 10 of the roller shaft 9. Spanner wrench holes 14 are provided in the flanges 8 of the roller 7 for holding each roller against turning during the tightening of the adjusting nut 13. A cotter pin 15 extends through the roller shaft 9 and engages the nut 13 to prevent loosening thereof and of the bearings.

Each bearing box 11 has its body portion substantially square, as shown in Fig. 6, but it has a flange 16 on one end thereof and a threaded portion 17 on the opposite end thereof.

The bearing boxes 11 for the corresponding ends of the pair of rollers 7 are mounted in a slot 18 formed in an upstanding side 19 at each opposite end of the pair of rollers between posts 20 at the opposite ends of each side 19. The upper ends of the posts 20 are connected together by a bar 21 detachably connected thereto as by bolts 22, and closing the upper side of the slot 18. The bar 21 together with the upstanding posts 20, form the upper portion of the side wall 19 in which the slot 18 is formed for receiving the bearing boxes 11 of each opposite end of the pair of rollers 7.

The flange 16 on the inner end of bearing box 11 engages the inner face of the side wall 19 at the upper and lower edges of the slot 18, with said reduced threaded portion 17 of the bearing box extending outwardly through the slot and being engaged by a cap nut 23 screwed thereon, with a washer 24 interposed between the inner face of the cap nut 23 and the outer face of the side wall 19. The nut 23 is provided preferably with radial holes 25 in the periphery thereof for engagement by a spanner wrench to facilitate tightening and loosening thereof on the bearing box.

The interior of each bearing box 11 as closed by the cap nut 23, forms a closed chamber 26 adapted to receive lubricant for the bearings 12. A lubricant fitting is shown at 27 in the cap nut 23 through which lubricant may be introduced into the chamber 26. A flat packing washer 28 closes the inner side of the lubricant chamber 26 between the inner end of the bearing box 11 and the shaft portion 9 of the roller to confine the lubricant to said chamber.

The bearing boxes 11 are adapted for relatively close sliding fit in the opposite ends of each wall slot 18 to receive the drill stem or kelly therebetween. When wear occurs and it is desired to adjust either or both of the rollers transversely toward or from the central axis of the opening 6, coaxial of the table 1, the bearing boxes 11 may be moved inward a sufficient distance, and shims of the required thickness inserted behind the bearing boxes 11 between the same and the corresponding posts 20, as indicated at 29. These shims will serve to hold the bearing boxes in their properly adjusted positions relative to the bushing body.

The rollers 7 and upper portion of the bushing body are enclosed within a cover 30, rigidly secured to said body by set screws 31 that engage the upper ends of the posts 20. The cover 30 has a central opening 32 therein of appreciable size sufficient for freedom of movement of the kelly or drill stem downward therethrough and between the rollers. Thus, the cover 30 prevents the operator from becoming entangled in the rotary bushing drive assembly, while it is rotating at high speed and yet it does not prevent freedom of movement of the kelly therethrough between the rollers. The cover also serves as a shield for the slots 18, bearing boxes 11 and cap nuts 23, tending to reduce the accumulation of oil, mud, and foreign substances thereon, and for adjustment of these parts as may be required.

The cover 30 is provided also with ribs 33 on the inner side thereof and arranged on each opposite side of the central axis of the body, as shown in Fig. 2, in position to engage over or substantially bear upon the outer upper edge of the cap nuts 23 when screwed into place to prevent said nuts from working loose accidentally, disturbing the secure mounting of the rollers.

During the operation of the guide bushing for the kelly, the longitudinal movement of the latter will cause turning movement of the rollers 7, reducing the wear thereon, as well as on the kelly. However, when wear occurs either on the rollers or on the kelly, the bearing boxes 11 may be adjusted to compensate for this wear, by loosening the cap nuts 23 and sliding the bearing boxes toward each other to the desired extent for providing the proper engagement of the rollers with opposite sides of the kelly. Thereafter, the tightening of the cap nuts 23 securely clamps the bearing boxes in place by frictional engagement with opposite sides of each wall 19 and preventing the bearing boxes from working loose or displacing the ends of the rollers. The shims 29 may be used as a further means of holding the bearing boxes in place, if desired. These rollers may be adjusted also to accommodate drill stems of different sizes either smaller or larger, being moved toward or from each other and then securely clamped in place.

Figure 8:
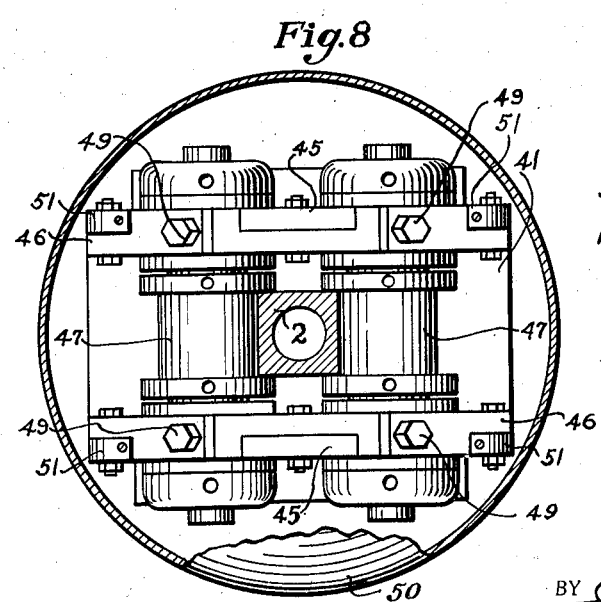
Fig. 8 is a top plan view thereof, with parts broken away and in section.
Figure 10:
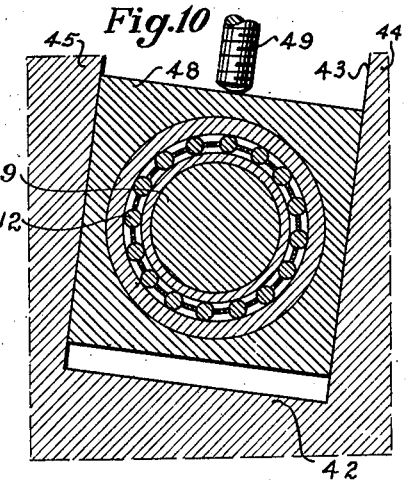
Fig. 10 is a vertical section through one of the slots and bearing boxes.

The modification of the invention shown in Figs. 7, 8 and 10, comprises a body 41 having side wall portions 42 in which laterally extending oblique slots 43 are formed between the opposite side posts 44 and a central post 45 connected together at the top by side bars 46. The rollers 47 have opposite ends thereof mounted in bearing boxes 48 fitted and slidably mounted in the laterally extending oblique slots 43 for adjustment therein toward and from the central axis of the body 41. The construction and mounting of the rollers are substantially the same as described above in connection with Figs. 1 to 6, but in addition to the clamping action of the bearing boxes 48, adjusting screws 49 are provided in the side bars 46 for forcing the bearing boxes 48 downward and directing the rollers into closely bearing engagement with opposite sides of the kelly. The downwardly inclined relation of the slots 43 provides for sufficient adjustment of the rollers and yet utilizes a more compact structure for adjustably mounting the guide rollers in the rotary table. It provides also for a greater component of force against the side posts 44, with more secure mounting of the rollers in a compact unit.

To accommodate for the adjusting screws 49, the cover 50 is secured upon upstanding arms 51 at the upper ends of the posts 44, from which the cover 50 extends downward over the body portion and around the rollers to enclose and protect the same, as described above.

Where the guide rollers are thus adjustable toward and from the axis of the drill stem, they may be moved to accommodate a wide range of sizes of kelly joints, while yet using the same rollers. This is even more true of the form shown in Figs. 1 to 6, where the slots are open from side to side of the kelly for ready adjustment of the rollers to the extent that may be necessary according to the size of kelly used.

I claim:

1. A guide bushing for a drill stem comprising a body having an opening therein for receiving the drill stem, said body having means forming a pair of guideways extending laterally at an angle to the axis of the drill stem opening, means for guiding the drill stem through the opening including a roller having opposite ends mounted in the guideways and adjustable toward and from the axis of the opening, and means bearing against opposite sides of the guideways for securing said roller in a plurality of laterally adjusted positions relative to the axis of the drill stem opening.

2. A guide bushing for a drill stem comprising a body having an opening therein for receiving the drill stem, said body having means forming a pair of spaced slots on opposite sides of the axis of the body and extending laterally at an angle thereto, means for guiding said drill stem through the body opening including a roller having opposite ends mounted in the slots and adjustable therein toward and from the axis of the opening, and means having clamping engagement with opposite sides of each of the slots for adjustably securing the opposite ends of the roller in different laterally adjusted positions relative to the axis of the opening.

3. A guide bushing for a drill stem comprising a body having an opening therein for receiving the drill stem, said body having means forming a pair of spaced slots on opposite sides of the axis of the body and extending laterally at an angle thereto, means for guiding said drill stem through the body opening including a roller, bearing boxes having means journaling opposite ends of the roller and mounted in the slots for slidable adjustment toward and from the axis of the opening, and means having clamping engagement with opposite sides of the slots for securing said bearing boxes and roller in different laterally adjusted positions relative to the axis of the opening.

4. A guide bushing for a drill stem comprising a body having an opening therein for receiving the drill stem, said body having means forming a pair of spaced slots on opposite sides of the axis of the body and extending laterally at an angle thereto, means for guiding said drill stem through the body opening including a roller having projecting ends integral therewith, bearing boxes receiving and journaling said ends of the roller, said bearing boxes being slidably mounted in the slots for adjustment toward and from the axis of the opening, and means connected with the bearing boxes providing clamping engagement with opposite sides of each slot for securing the bearing boxes and the roller in different adjusted positions relative to the axis of the opening.

5. A guide bushing for a drill stem comprising a body having an opening therein for receiving the drill stem, said body having means forming a pair of spaced slots on opposite sides of the axis of the body and extending laterally at an angle thereto, means for guiding said drill stem through the body opening including a roller having reduced opposite ends integral therewith, bearing boxes receiving said reduced ends of the rollers and having anti-friction bearings journaling the same for turning movement therein, said bearing boxes being mounted in the slots for lateral adjustment toward and from a medial plane through the axis of the opening to different adjusted positions relative thereto, each bearing box having a flange thereon bearing against one side of the means forming the slot and having a cap nut threaded thereon and bearing against the opposite side of said means for clamping the bearing box therebetween.

6. A guide bushing for a drill stem comprising a body having an opening therein for receiving the drill stem, said body having means forming a pair of spaced slots on opposite sides of the axis of the body and extending laterally at an angle thereto, means for guiding said drill stem through the body opening including a roller having reduced opposite ends integral therewith, bearing boxes receiving said reduced ends of the rollers and having anti-friction bearings journaling the same for turning movement therein, said bearing boxes being mounted in the slots for lateral adjustment toward and from a medial plane through the axis of the opening to different adjusted positions relative thereto, each bearing box having a flange thereon bearing against one side of the means forming the slot and having a cap nut threaded thereon and bearing against the opposite side of said means for clamping the bearing box therebetween, and a cover secured to the body and enclosing the upper portion thereof, said cover having means rigid therewith extending substantially into bearing relation with the cap nuts to prevent loosening thereof on the bearing boxes.

7. A guide bushing for a drill stem comprising a body adapted to receive the drill stem therethrough, and means for guiding the drill stem through the body including a roller, a bearing box mounted on the body and journaling each end portion of the roller, said body having a guideway receiving the bearing box, and means connected with the bearing box and having clamping engagement with the guideway for securely fastening the bearing box in place therein.

8. A guide bushing for a drill stem comprising a body adapted to receive the drill stem therethrough, and means for guiding the drill stem through the body including a roller, a bearing box mounted on the body and journaling each end portion of the roller, said body having a guideway receiving the bearing box, said bearing box having a flange on one side thereof bearing against one side of the guideway, and a nut threaded on the opposite side of the bearing box and bearing against the opposite side of the guideway for coacting with the flange to clamp the bearing box in place on the guideway.

9. A guide bushing for a drill stem comprising a body having an opening therein for receiving the drill stem, said body having upstanding sides thereon, each having a pair of laterally spaced posts, a connecting bar extending between the upper ends of the posts of each pair and cooperating with the side and posts to form a slot in the side extending transversely of the axis of the body between the posts, a pair of rollers having the opposite ends thereof mounted in the slots and slidable therein toward and from each other for receiving therebetween the drill stem, and means for securing said rollers in adjusted positions relative to each other.

10. A guide bushing for a drill stem comprising a body having an opening therein for receiving the drill stem, said body having upstanding sides thereon, each of said sides having a pair of upwardly extending and laterally diverging slots formed therein with the lower inner ends of said slots extending toward a plane through the axis of the body, guide rollers for the drill stem mounted in the slots and bodily adjustable along the slots for movement toward and from said plane, bearings mounted in the slots and journaling the rollers, and means for clamping the bearings in fixed positions relative to the slots.

OSCAR L. DERRICK.